United States Patent
Coteus et al.

(10) Patent No.: US 9,298,395 B2
(45) Date of Patent: Mar. 29, 2016

(54) MEMORY SYSTEM CONNECTOR

(71) Applicant: International Business Machines Corporation, Armonk, NY (US)

(72) Inventors: Paul W. Coteus, Yorktown, NY (US); Shawn A. Hall, Pleasantville, NY (US); Hillery C. Hunter, Deerfield, IL (US); Douglas J. Joseph, Danbury, CT (US); Charles A. Kilmer, Essex Junction, VT (US); Kyu-hyoun Kim, Mount Kisco, NY (US); Warren E. Maule, Cedar Park, TX (US); Todd E. Takken, Brewster, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 248 days.

(21) Appl. No.: 13/657,058

(22) Filed: Oct. 22, 2012

(65) Prior Publication Data

US 2014/0115281 A1 Apr. 24, 2014

(51) Int. Cl.
*G06F 3/06* (2006.01)
*H05K 7/02* (2006.01)
*G06F 1/20* (2006.01)
*G06F 1/32* (2006.01)

(52) U.S. Cl.
CPC ............... *G06F 3/0671* (2013.01); *G06F 1/20* (2013.01); *G06F 1/3275* (2013.01)

(58) Field of Classification Search
None
See application file for complete search history.

(56) References Cited

U.S. PATENT DOCUMENTS

| | | | |
|---|---|---|---|
| 3,287,703 A | 11/1966 | Slotnick | |
| 5,784,706 A | 7/1998 | Oberlin et al. | |
| 6,253,287 B1 | 6/2001 | Green | |
| 6,705,877 B1 | 3/2004 | Li et al. | |
| 6,889,307 B1 | 5/2005 | Scheuerlein | |
| 6,950,923 B2 | 9/2005 | O'Connor et al. | |
| 7,009,872 B2 * | 3/2006 | Alva | 365/158 |
| 7,257,129 B2 * | 8/2007 | Lee et al. | 370/464 |
| 7,282,790 B2 * | 10/2007 | Coteus et al. | 257/685 |
| 7,978,721 B2 * | 7/2011 | Jeddeloh et al. | 370/419 |
| 8,397,013 B1 * | 3/2013 | Rosenband et al. | 711/103 |
| 8,533,403 B1 * | 9/2013 | Law | 711/151 |
| 8,612,809 B2 * | 12/2013 | Casper et al. | 714/708 |
| 2002/0196659 A1 | 12/2002 | Hurst et al. | |
| 2006/0268519 A1 | 11/2006 | Bartley et al. | |
| 2009/0075502 A1 | 3/2009 | Coteus et al. | |
| 2010/0036994 A1 | 2/2010 | Resnick | |
| 2010/0332764 A1 | 12/2010 | Jouppi | |

(Continued)

FOREIGN PATENT DOCUMENTS

| | | |
|---|---|---|
| KR | 2011088192 A | 8/2011 |
| WO | 2010078021 A2 | 7/2010 |

OTHER PUBLICATIONS

Carson, Flynn, et al., "3-D stacked package technology and trends", IEEE, vol. 97, No. 1, Jan. 2009, p. 31-42.

(Continued)

*Primary Examiner* — Adam M Queler
*Assistant Examiner* — Tracy Chan
(74) *Attorney, Agent, or Firm* — Cantor Colburn LLP

(57) ABSTRACT

According to one embodiment a memory system includes a circuit card and a separable area array connector on the circuit card. The system also includes a memory device positioned on the circuit card, wherein the memory device is configured to communicate with a main processor of a computer system via the area array connector.

17 Claims, 6 Drawing Sheets

(56) References Cited

U.S. PATENT DOCUMENTS

| | | | |
|---|---|---|---|
| 2011/0048672 A1* | 3/2011 | Martin et al. | 165/46 |
| 2011/0246828 A1 | 10/2011 | Monchiero et al. | |
| 2011/0264858 A1 | 10/2011 | Jeddeloh et al. | |
| 2014/0040532 A1* | 2/2014 | Watanabe et al. | 711/103 |

OTHER PUBLICATIONS

Fawibe, Ademola, et al., "New Memory Organizations for 3D DRAM and PCMs", Architecture of Computing Systems, ARCS 2012—25th International Conference, Proceedings Publication Date: Feb. 29, 2012, pp. 1-12.

\* cited by examiner

MEMORY SYSTEM CONNECTOR

BACKGROUND

The present invention relates generally to computer memory, and more particularly to a connector for a memory system.

Computer systems often require a considerable amount of high speed memory, such as random access memory (RAM), to hold information, such as data and programs, when a computer is powered and operational. Memory device densities have continued to grow as computer systems have increased performance and complexity.

Communication from a main processor to locations on dense memory devices can require additional power due to longer signal paths resulting from the increased density. In addition, increased power consumption within high density memory devices can lead to temperature management issues. Further, in the high density memory devices, data access times and latency associated with data operations are increased while effective bandwidth between the main processor and memory are reduced due to the distance between the processor and memory. Longer signal paths may also allow for more chances for corruption or data errors during data transmission between the main processor and memory. Further, although memory device densities have increased rapidly, bandwidth for communication to memory modules may be reduced by bottlenecks in the communication path, such as connectors or channels that cannot adequately accommodate the increased bandwidths.

SUMMARY

According to one embodiment, a memory system includes a circuit card and a separable area array connector on the circuit card. The system also includes a memory device positioned on the circuit card, wherein the memory device is configured to communicate with a main processor of a computer system via the area array connector.

According to another embodiment, a method for operating memory system includes receiving, in a memory module, a command from a main processor, the receiving via a connector on a circuit card, transmitting the command from the connector to a buffered memory stack, processing the command in the memory stack and processing, by the memory stack, a variable bandwidth and variable speed communication during operation of the memory system.

DETAILED DESCRIPTION

Figure 1:
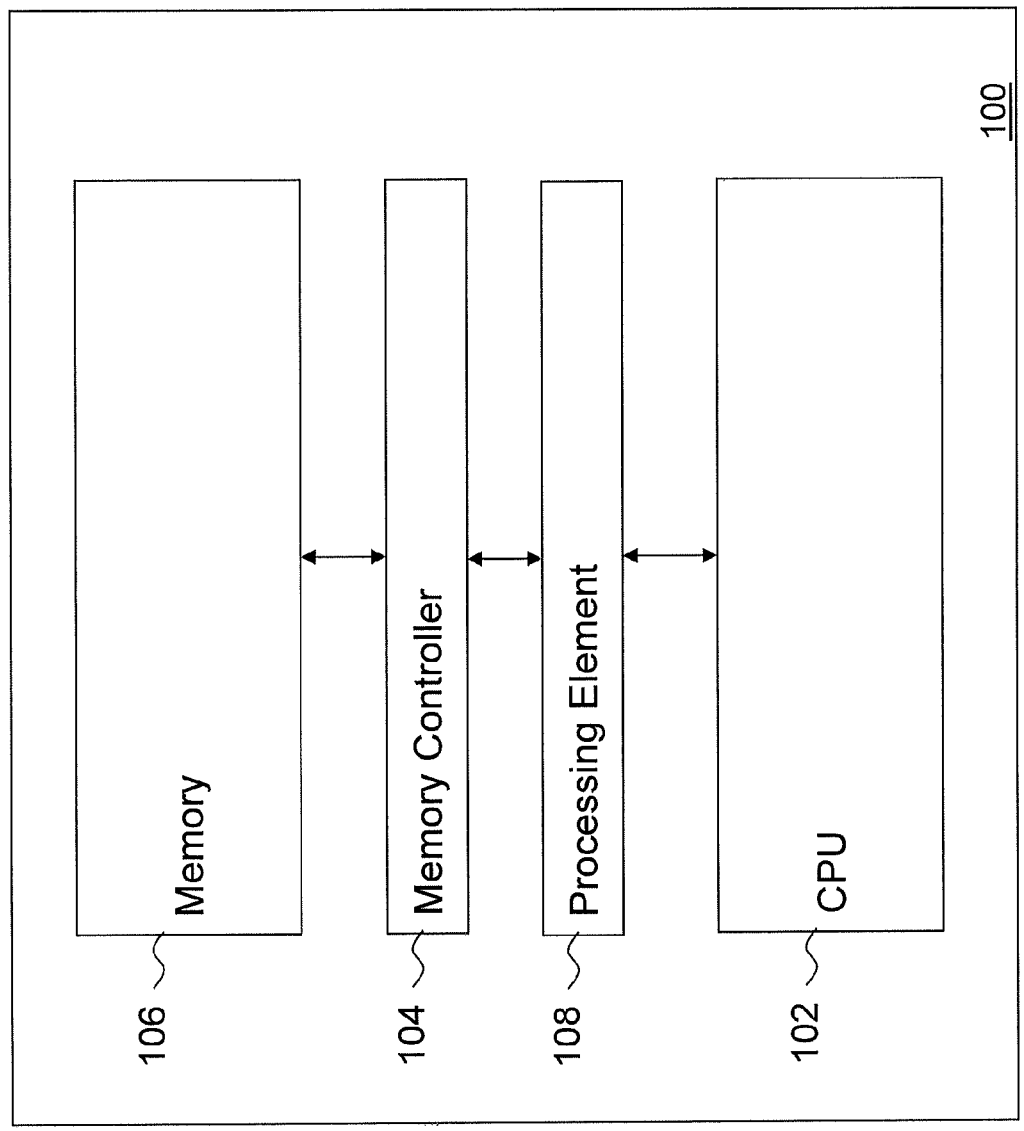
FIG. 1 illustrates a block diagram of a system for active buffered memory in accordance with an embodiment.

An embodiment is directed to operating a memory system including a memory device, such as a buffered memory device. The memory device may be any suitable memory device including one or more memory device (e.g., random access memory "RAM" chips) connected to a hub chip (also referred to as logic chip or memory controller chip) configured to control the memory device. In an embodiment, the buffered memory device includes layers of memory that form a three dimensional ("3D") memory device where individual columns of memory chips form stacks or vaults in communication with the hub chip. In one embodiment, a plurality of memory stacks are located on a memory module, where each stack has a respective hub chip. The hub chips may include a processing element configured to communicate to the memory and other processing elements in other hub chips. In an embodiment, a processing element accesses a selected address in a vault through an interconnect network. As discussed herein, vault may refer to a bank within a memory slice, where one example of the bank may be a memory stack. To provide increased bandwidth communication between a buffered memory device, the device communicates and transmits signals through a separable area array connector on a circuit card of the module. In one embodiment, the hub chip includes a portion or all of an interconnect network, such as a crossbar switch, that provides communication between hub chips and memory stacks on the memory module. In embodiments, a memory stack includes multiple DRAM dies stacked together, where each DRAM die is divided into a number of banks. Further, in the example, a group of banks in each die, vertically aligned, may be called a vault accessed by a vault controller.

In an embodiment, the area array connector memory module has a plurality of buffered memory stacks. The connector may be any suitable area array connector, such as a land grid array (LGA) or hybrid LGA connector. In an embodiment, a hybrid LGA, used to connect a first component such as a circuit card to a second component such as an electronics package, is connected to the first component by solder and to the second component by an array of compressed contacts. In contrast, a dual-compression LGA is connected to the first component by a first array of compressed contacts and to the second component by a second set of compressed contacts. In an embodiment, the connector is separable, where it may allow the module to be plugged into a main circuit board, thus allowing for removal, installation and expandability. In one embodiment, hub chips are built into each buffered memory stack. In another embodiment, hub chips are located on the circuit card of the module, separate from the buffered memory stacks. One example of the memory module may provide signal connections at the connector via a silicon interposer or dense organic wiring substrate. In addition, the area array connector memory module may provide power conversion and a cooling mechanism on the memory module. One embodiment may include a hub chip plus memory stacks on a memory module, where a main processor is on a main circuit board. In embodiments, one or more hub chips may control one or more memory stacks. The hub chips may be physically located on the memory module card or within the memory stacks. In an embodiment, more than one hub chip may be located on a memory stack. Embodiments include a memory module with variable bandwidth and/or variable speed communication to one or more processor sockets. Further, the bandwidth and/or speed communication may be changed during memory module operation while the memory is powered up (i.e., dynamically variable bandwidth and speed). A common module may be used to connect plurality of memory stacks to the processor, thus enabling processor-to-memory connections of variable bandwidth and/or speed. Because the memory stacks are connected via the hub chip, all the memory on the module is accessible to the processor, even when only a low-bandwidth connection (e.g., to a single memory stack) is made. An embodiment of the memory module with the area array connector provides configurability that reduces power consumption and also improves fault tolerance.

Embodiments include a memory stack with a processing element and memory controller in the hub chip, referred to as an active buffered memory device. The active buffered memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In an embodiment, the active buffered memory device is configured to load configuration information or instructions from a part of the active buffered memory device into a processing element following receiving a command from an external requestor, such as a main processor or another processing element. In addition, the processing element may perform virtual-to-real address translations that it computes while executing the loaded instructions.

In embodiments, it is desirable to have processing capabilities within an active buffered memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory; the system's main processor configures the processing elements within the active buffered memory device and then instruct them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

FIG. 1 illustrates a block diagram of a system for storing and retrieving data in a memory in accordance with an embodiment. A system 100 depicted in FIG. 1 includes a computer processor 102, a memory 106 having memory devices, as well as a memory controller 104 and processing element 108 for receiving data from the computer processor 102 to be stored in the memory 106. In an embodiment, the memory controller and processing element 108 may be referred to as a hub chip.

In one embodiment, the memory 106 and memory controller 104 is coupled to the computer processor 102 and processes write requests from the computer processor 102. In one example, the write requests contain data to be written to the memory 106 and a memory location of the instruction(s), where the instruction forms the virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written. The real address for a given logical address may change each time data in the memory 106 is modified.

In an embodiment, the command from the computer processor 106 specifies a sequence of instructions that include setup actions, execution actions and notification of completion actions. The setup actions may include configuration actions such as a command that loads configuration information from the memory within the memory device directly into the processing element 108. By providing the configuration information in the memory device, the processing element 108 is able to be properly configured rapidly after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing element 108. The execution actions include execution of the code that includes load, store, arithmetic/logical and other instructions.

In an additional mode of an embodiment, the processing element 108 is coupled to the computer processor 102 and receives a command from the computer processor 102. The command corresponds to instructions stored in the memory to perform write requests for data to be written to the memory 106. In the embodiment, the instruction(s) executes and forms the virtual address corresponding to the write location in memory 106. The command may include a real address where the instruction(s) are stored. The memory controller 104 and/or processing element 108 stores data at a real address within the memory 106. In an embodiment, the processing element 108 maps the virtual address to a real address in the memory 106 when storing or retrieving data. The real address for a given logical address may change each time data in the memory 106 is modified. The computer processor 102 provides commands to the memory 106, where the processing element 108 receives the command and fetches corresponding instructions from the memory.

The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. Further, embodiments may include fewer devices than depicted, such as a memory system with no processing element 108. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, processing element 108 and computer processor 102.

Figure 2:
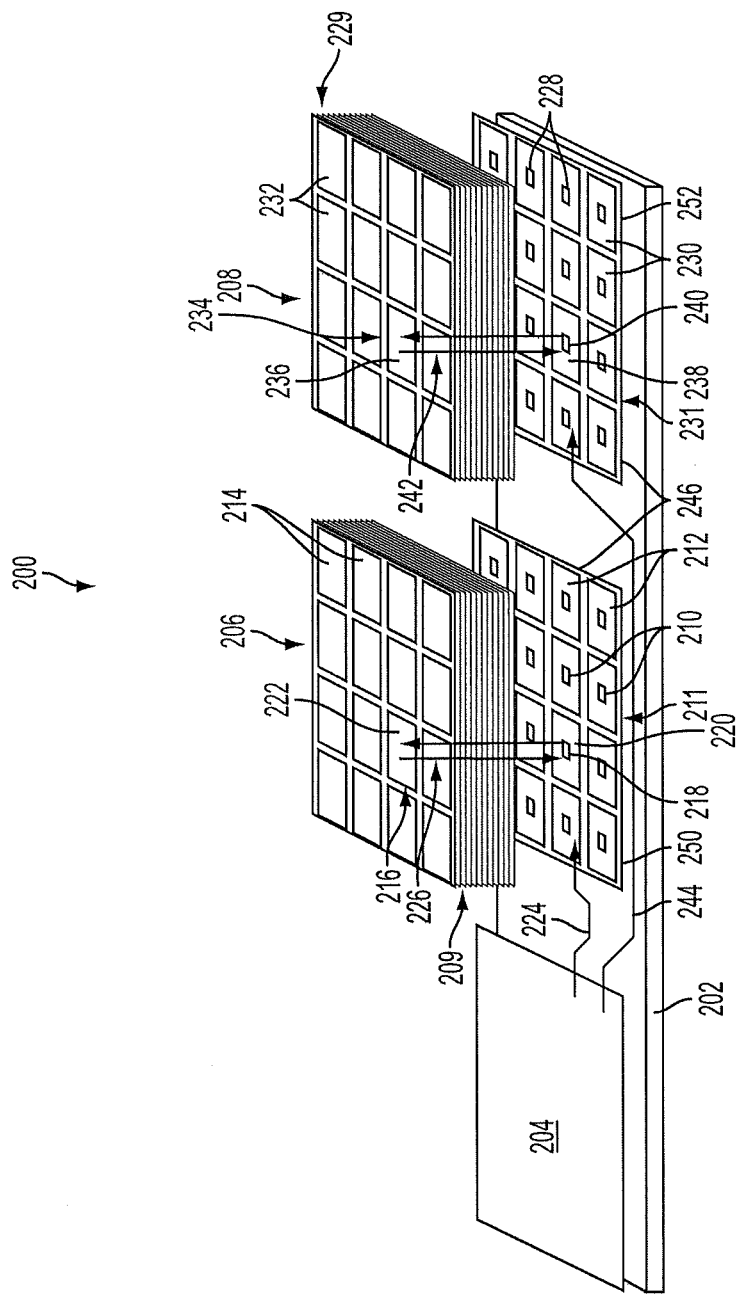
FIG. 2 illustrates a schematic diagram of a memory system with active buffered memory in accordance with an embodiment.

FIG. 2 is a diagram of an exemplary computer system 200 implementing one embodiment of buffered memory. The computer system 200 includes a circuit board 202, a main processor 204, active buffered memory device 206 and active buffered memory device 208. In an embodiment, the circuit board 202 is a silicon carrier. The buffered memory device 206, active buffered memory device 208 and main processor 204 are disposed on the circuit board 202. As depicted, portions of the buffered memory modules 206 and 208 are exploded to show details of the computer system 200 arrangement. The buffered memory modules 206 and 208 communicate to the main processor 204 via signal paths 224 and 244, respectively. In an embodiment, the buffered memory modules 206 and 208 are active memory devices including processing elements 212, 228 and memory controllers 210, 230. The processing elements and memory controllers act as hub chips that control the memory stacks and provide local processing proximate memory. As depicted, the buffered memory module 206 is arranged in layers, where a base layer 211 includes a plurality of memory controllers 210 and processing elements 212. For example, the buffered memory module 206 includes layers 209 of memory stacked or placed on top of the base layer 211, where the layers 209 each have a plurality of memory elements. As depicted, the base layer 211 also includes an interconnect network 246 to enable high bandwidth communication between memory, memory controllers and processing elements in the device. One implementation of the memory module may have a layer of a silicon interposer or dense organic wiring substrate to provide signal connections between memory and hub chips. Further, the memory modules 206 and 208 may be connected, respectively, to the main circuit board 202 via area array connectors 250 and 252. In an embodiment, the area array connectors 250 and 252 are disposed on a circuit card of each memory module 206 and 208.

In an embodiment, the buffered memory module 206 includes a plurality of memory vaults 214, where each memory vault 214 includes a memory element from each layer 209, the memory vaults 214 positioned adjacent to memory controllers 210 and processing elements 212. Specifically, the exemplary buffered memory module 206 includes layers of 16 memory elements, where the memory element layers form memory stacks, including a stack 216, where the stack 216 includes a memory vault 222 disposed above a memory controller 218 and a processing element 220. A high bandwidth communication path 226 provides a high bandwidth, direct and substantially reduced length (e.g., as compared to paths 224, 244) communication path between the processing element 220 and memory locations within the memory vault 222, thus reducing latency and power consumption for memory accesses. For example, the processing element 220 may receive a command from the main processor 204, load instructions from within the buffered memory module 206 based on the command, and, as part of the loaded instructions, access data at a location in the memory vault 214 and perform a complex operation on the data in the processing element 220. Further, the processing element 220 may also store data, such as the result, in the memory vault 214 and transmit a value or signal to the main processor 204 following execution of the command. In an embodiment, the processing element stores or writes data (e.g. an operand) from a register in the processing element to the memory vault 214. The processing element 220 is also configured to translate addresses from virtual-to-real and real-to-virtual as part of the read or store operations. Thus, the processing element 220 provides instruction loading, address translation, complex operations and other tasks local to the memory to reduce latency, save power and free up the main processor 204 to perform other tasks.

Similarly, the buffered memory module 208 includes a plurality of memory controllers 228 and processing elements 230 disposed on a base layer 231. In an embodiment, the buffered memory 208 includes layers 229 of memory devices placed on top of the base layer 231, where the layers 229 each have a plurality of memory devices. The base layer 231 also includes an interconnect network 246 to enable high bandwidth communication between memory and processing elements in the device. In an embodiment, the interconnect networks 246 of buffered memory module 206 and buffered memory module 208 are coupled and allow communication between processing elements and memory on separate devices.

In an embodiment, the buffered memory module 208 include a plurality of memory vaults 232, where each memory vault 232 includes a memory element from each layer 209, the memory vaults 232 positioned adjacent to memory controllers 228 and processing elements 230. The exemplary buffered memory module 208 includes 16 stacks, including stack 234, where the stack 234 includes a memory vault 236 disposed above a memory controller 240 and a processing element 238. A high bandwidth communication path 242 provides communication between the processing element 230 and memory locations within the memory vault 236. In another embodiment, the hub chip is located on the memory module but separate from the memory stacks, and is configured to control communication with the memory.

In other embodiments, the buffered memory modules 206 and 208 include any suitable buffered memory, such as hybrid memory elements, phase change memory (PCM) elements, dynamic random-access memory (DRAM), FLASH and magnetoresistive random-access memory (MRAM). The hybrid memory elements in the modules may include memory controllers that are hub chips configured to control the memory in each memory stack. One embodiment of the hybrid memory elements includes a memory stack without an associated processing element. In an embodiment, a computer system may include an active buffered memory module and a hybrid buffered memory module, where processing may be performed on the active buffered memory module for both active and hybrid modules. In addition, the processing elements in the active buffered module are configured to control and communicate with the hybrid memory as well as the active buffered memory. In an embodiment, the control for the active buffered memory is provided by the processing elements in the memory, which may not be present in the hybrid memory elements.

Figure 3:
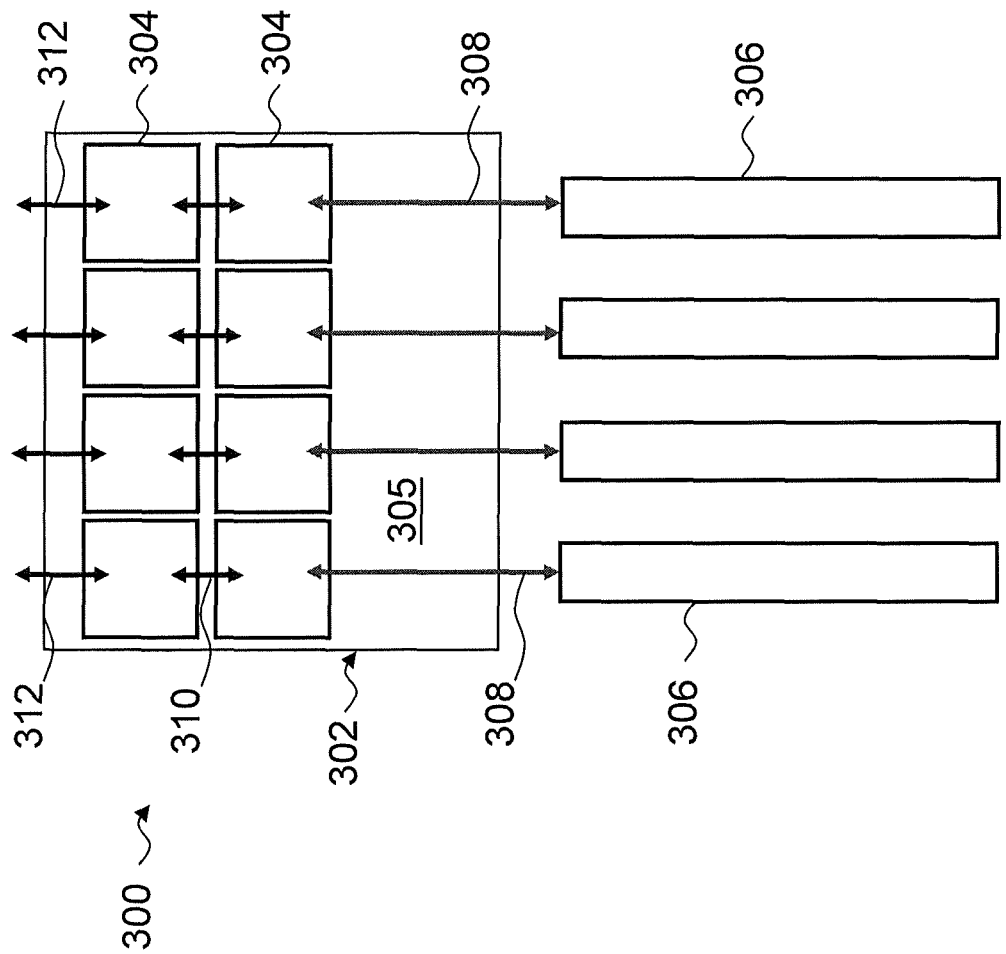
FIG. 3 illustrates a block diagram of an memory system including a buffered memory module in accordance with an embodiment.

FIG. 3 is a block diagram of an exemplary memory system 300 including a buffered memory module 302. The buffered memory module 302 includes a plurality of buffered memory devices 304 or memory stacks disposed on a circuit card 305. The buffered memory module 302 connects to a main circuit board of a computer via area array connector 312, where the connector includes a plurality of links or channels. In an embodiment, the channels on connector 312 are short range links. The buffered memory devices 304 on the circuit card 305 may communicate with each other via channels 310. Communication on the module may be controlled by a hub chip, thus enabling high-bandwidth data transmission and variable width and/or speed communication. In addition, the buffered memory module 302 includes a connector 308 to connect to inline memory modules 306, thus allowing inline memory modules to "chain" to the buffered memory module 302. In one embodiment, the connector 308 may include a plurality of channels that are long range links or channels that connect to the inline memory modules 306. In an embodiment, the connector 312 has short range channels that are lower power relative to channels in connector 308.

The connector 308 provides compatibility and flexibility to connect various memory form factors to a main computer circuit card. In an example, inline memory from a previous computer system may be saved and used in a newer computer system having the buffered memory module 302, thus enabling re-use of existing memory to preserve existing system investments while improving system performance.

Figure 4:
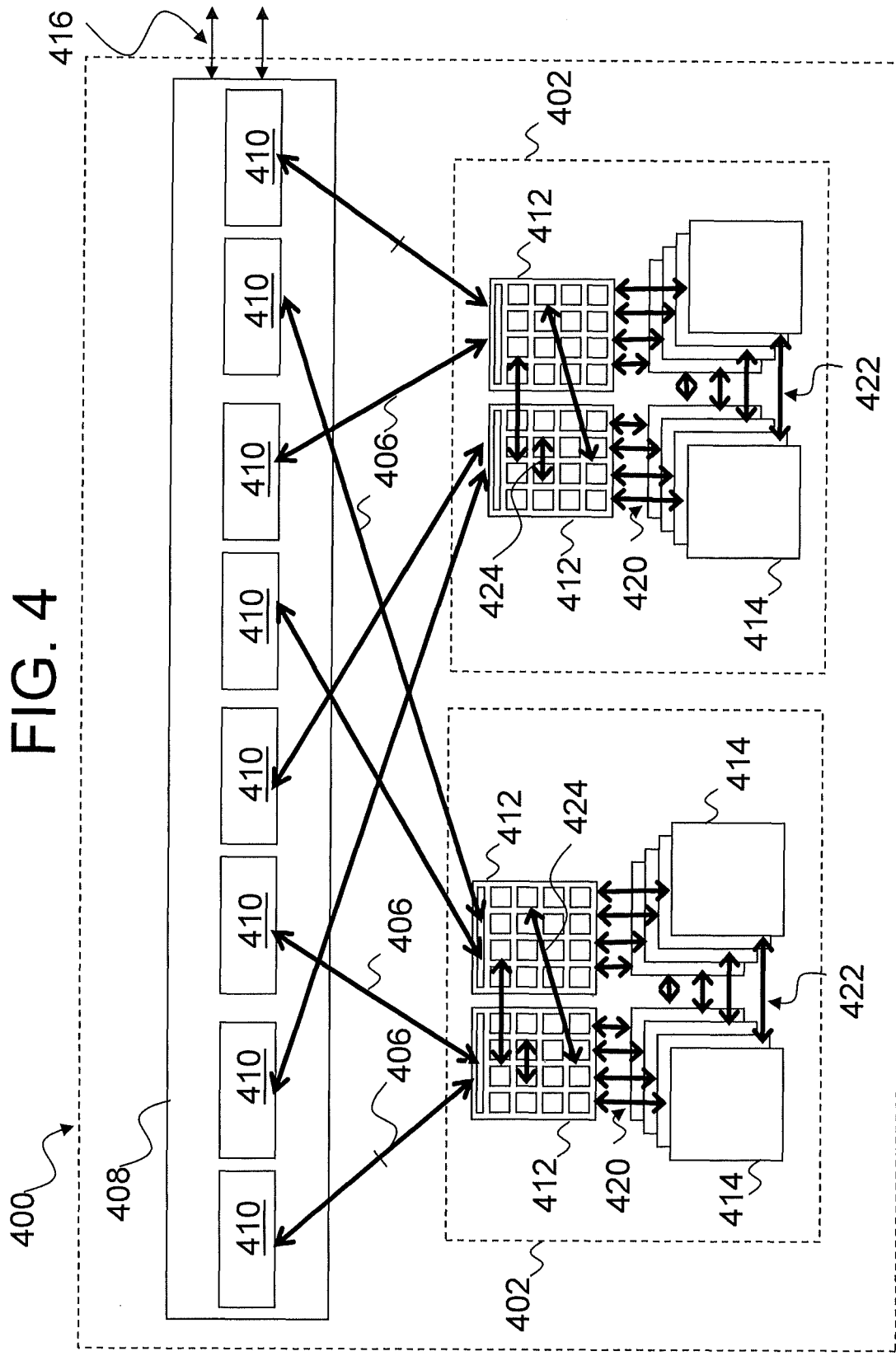
FIG. 4 illustrates a diagram of a computer system including one or more processors with processor sockets connected to memory systems.

FIG. 4 is a diagram of an exemplary computer system 400 including one or more processors with processor sockets 408 connected to memory systems 402 via channels 406. The memory systems 402 each comprise memory modules 412 and 414. As depicted, channels 406 couple memory modules 412 to memory bus interfaces (MBIs) 410 in the processor sockets 408, where the sockets are coupled to one or more processors. In an embodiment, the channels 406 provide multiple channel connections from each memory module 412 to several different MBIs 410, where the MBIs are located on the same or different processor sockets (and corresponding processors) in the computer system 400, thus providing flexibility when communicating with the high bandwidth memory systems 402. In embodiments, the memory modules 412 are active buffered modules. One embodiment of the channels 406 are described as cross-wired channels. In one embodiment, the memory modules 412 support communication via a plurality of memory channels 406 from each module to the one or more processors using the cross-wired arrangement. In an exemplary embodiment, memory modules 414 may also communicate to the processor sockets 408 through active buffered memory modules 412. For example, the memory modules 414 are hybrid memory modules connected (i.e., chained) to the active buffered memory modules 412 by channels 420. The memory modules 414 may also communicate directly to other memory modules 412 and 414, such as through channels 422. In yet another embodiment, the memory modules 414 may be DDR3 and/or DDR4 random access memory (RAM) modules that communicate to the processor sockets 408 via the active buffered memory modules 412, thus providing support for existing or legacy modules in newer computer systems. In an embodiment, the channels may be integrated into and/or controlled by the hub chip. As depicted, the processor sockets 408 may be coupled to a link or router via channels 416.

In addition, embodiments provide channels 424 for direct communication between memory devices, such as buffered memory stacks, in the memory modules 412, via hub chips. Further, the channels 424 and hub chips may provide direct communication to memory devices on separate memory modules as well. For example, the hub chip may allow any memory device in any memory module to directly communicate with any other device or processor socket(s) via channels in the provided area array connector. An embodiment of the connector is a silicon interposer providing direct connections between memory devices and/or processor sockets for each device. In one embodiment, the memory modules 414 are additional buffered memory modules chained to the memory modules 412 by channels 420 controlled by the hub chips. In an embodiment, these connections in the memory modules and channels are configurable and reconfigurable by the hub chips. In addition, the configurability for channels connecting portions of memory to a plurality of processor sockets provides improved fault tolerance by providing alternative communication paths if selected portions of the connector or channels are not working.

Figure 5:
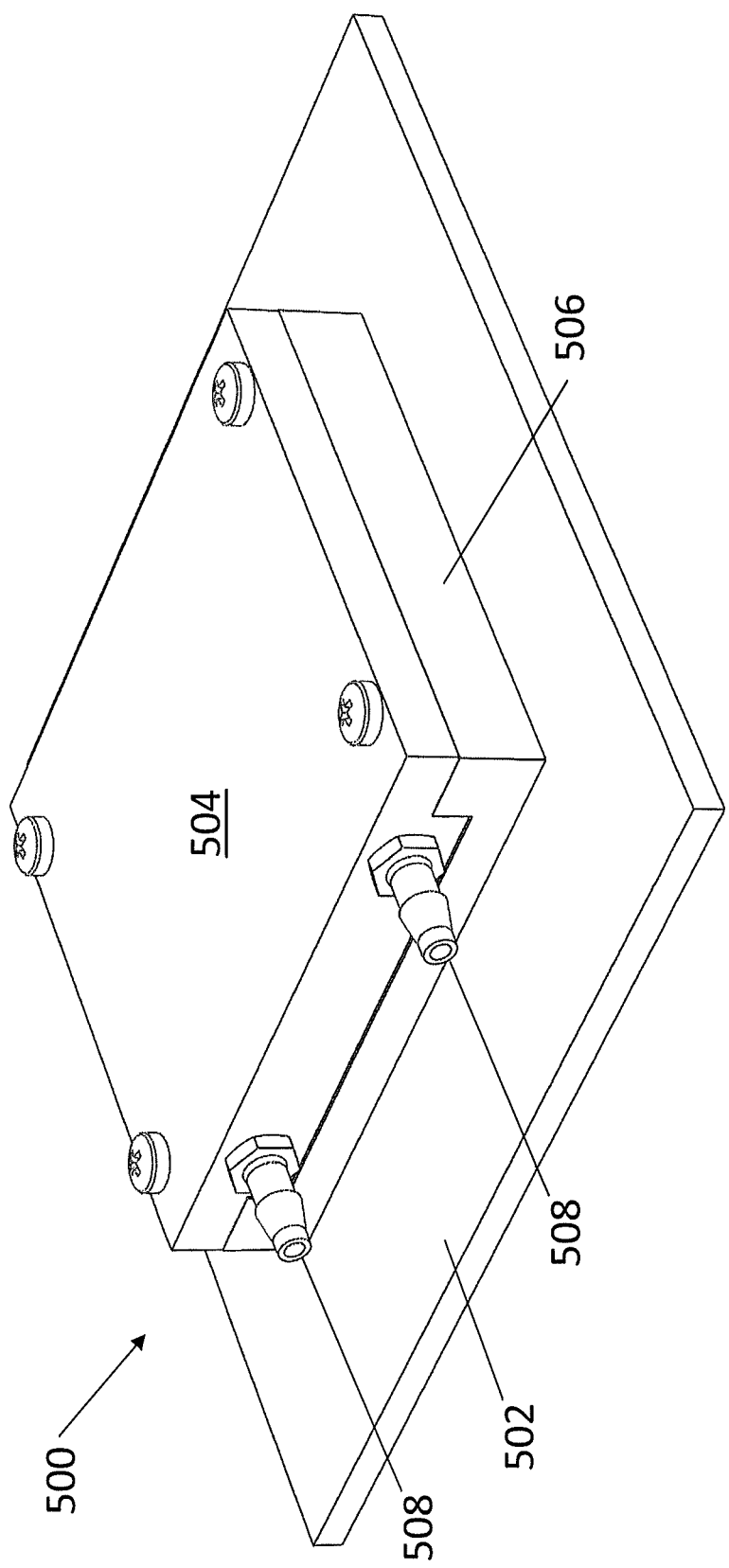
FIG. 5 illustrates a schematic diagram of an exemplary memory module placed on a circuit card in accordance with an embodiment.

FIG. 5 is a schematic diagram of a memory module 500 placed on a circuit card 502 according to an embodiment. The memory module 500 includes a cooling device 504 coupled to a memory device 506. The cooling device 504 is configured to provide cooling to the memory module 500 due to the high bandwidth communication and power conversion provided by embodiments of the memory module 500. The cooling device 504 may include any suitable mechanism for controlling a temperature of the memory module package, such as liquid cooling, fins and/or other suitable techniques for cooling memory packages. In one embodiment, the cooling device 504 includes ports 508 that flow a cooling fluid through the cooling device 504 as part of a heat exchange system. The cooling fluid may be provided by a suitable fluid source in the computer system. The cooling fluid may be any suitable heat absorbing and conducting fluid, such as a water-based solution.

Figure 6:
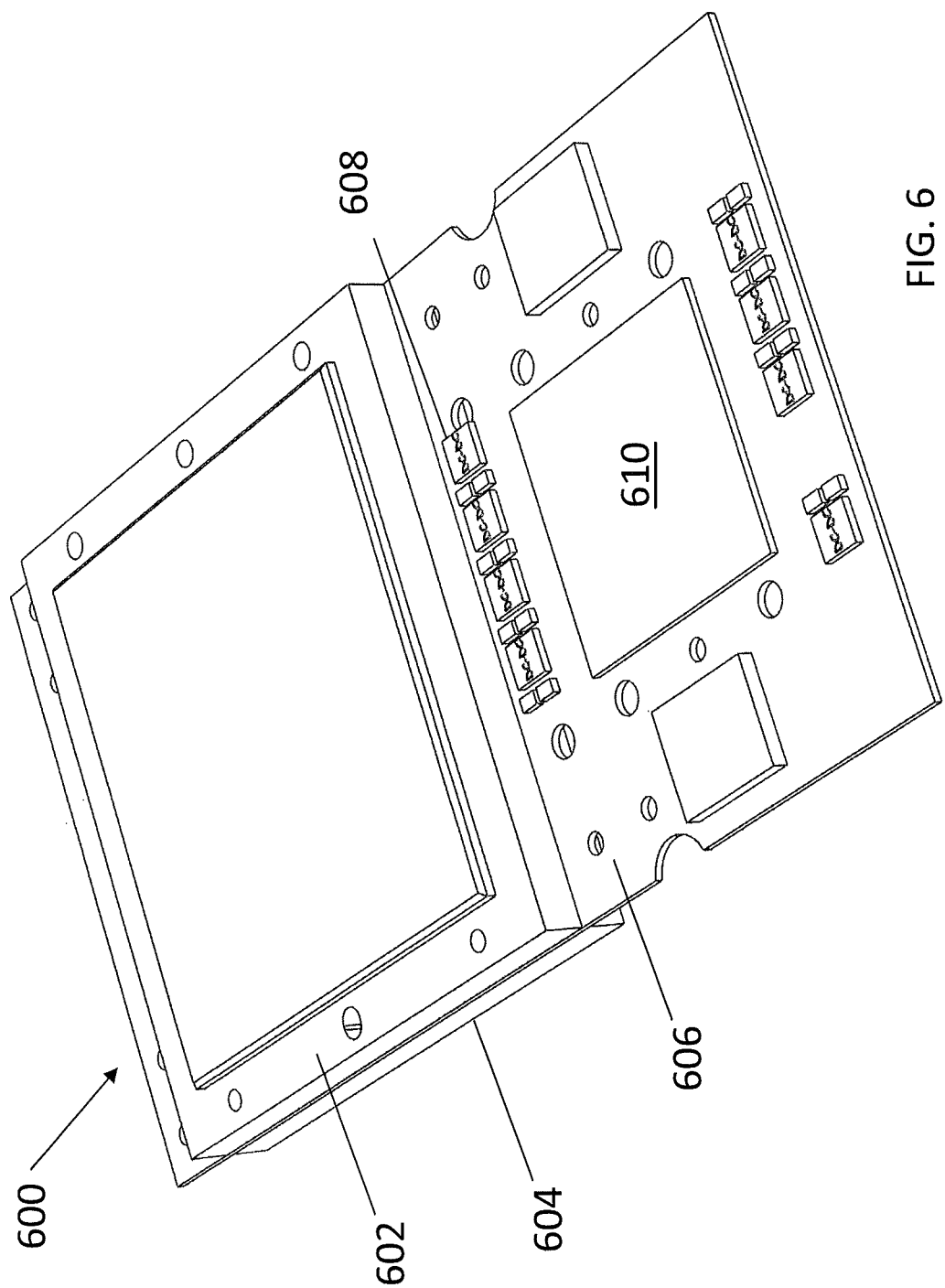
FIG. 6 illustrates a perspective diagram of a card for a computer system in accordance with an embodiment.

FIG. 6 is a perspective diagram of a card assembly 600 for a computer system according to an embodiment. The card assembly 600 includes a first memory module 602 and a second memory module 604 disposed on opposite sides of a circuit card 606. The first and second memory modules 602, 604 are each connected to a processor 610 on opposite sides of the circuit card 606 via a separable area array connector, as discussed above. Further, the card assembly 600 includes a power conversion device 608 configured to receive a selected voltage and provide a plurality of voltages to various inputs in the memory modules.

Technical effects and benefits include a memory system connector with improved configurability that improves power savings and reduces power consumption and also improves fault tolerance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A memory system comprising:
a circuit card;
a separable area array connector on the circuit card;
a first group of memory devices positioned on the circuit card, wherein the first group of memory devices is configured to communicate with a main processor of a computer system via the separable area array connector;
a second group of memory devices positioned on the circuit card, the second group of memory devices operable to communicate with the first group of memory devices on the circuit card, wherein each of the memory devices in the first group and the second group of memory devices is a separate buffered memory stack; and a plurality of channels to couple the second group of memory devices to a plurality of inline memory modules via a connector of the circuit card, wherein the separable area array connector connects to a plurality of processor sockets on a main circuit board, and the main processor on the main circuit board is configured to communicate with the first group of memory devices through the separable area array connector, with the second group of memory devices through the first group of memory devices, and with the inline memory modules through the second group of memory devices, wherein the separable area array connector comprises shorter range and lower power links relative to the channels of the connector.

2. The memory system of claim 1, further comprising a power conversion device on the circuit card.

3. The memory system of claim 2, wherein the power conversion device on the circuit card is configured to receive a single voltage via the separable area array connector and provide a plurality of voltage levels for use by the memory devices.

4. The memory system of claim 1, wherein the separable area array connector comprises a land grid array connector.

5. The memory system of claim 1, comprising a hub chip coupled to the memory devices and configured to control the memory devices.

6. The memory system of claim 1, further comprising hub chips, wherein each hub chip is located on each of the buffered memory stacks, wherein each hub chip is configured to control the respective buffered memory stack.

7. The memory system of claim 1, wherein the memory devices comprise at least one of: phase change memory, active buffered memory and hybrid memory.

8. The memory system of claim 1, further comprising a cooling device coupled to the circuit card, the cooling device comprising at least two ports to circulate a cooling liquid through the cooling device.

9. The memory system of claim 1, wherein each of the buffered memory stacks comprises at least one memory vault, at least one memory controller, and at least one processing element arranged in a stack, and the at least one processing element interfaces with the area array connector to communicate with the main processor.

10. The memory system of claim 1, wherein the buffered memory stacks communicate with the main processor of a computer system through the separable area array connector via a variable bandwidth and variable speed communication between the buffered memory stacks and the main processor during operation of the memory system.

11. A memory system comprising:
a circuit card;
a connector on the circuit card;
a first memory module comprising:
    a first plurality of buffered memory stacks positioned on the circuit card, wherein the buffered memory stacks communicate with a main processor of a computer system via the connector, the communication between the main processor and the buffered memory stacks being a variable bandwidth and variable speed communication during operation of the memory system; and
    a plurality of hub chips, wherein each hub chip is located on each of the buffered memory stacks and the hub chips are configured to control the respective buffered memory stack and control communication between the buffered memory stacks; and
a second memory module comprising a second plurality of buffered memory stacks disposed on an opposite side of the circuit card relative to the first memory module.

12. The memory system of claim 11, wherein the connector comprises a separable area array connector.

13. The memory system of claim 11, comprising a power conversion device on the circuit card.

14. The memory system of claim 13, wherein the power conversion device on the circuit card is configured to receive a single voltage via the separable area array connector and provide a plurality of voltage levels for use on the circuit card.

15. The memory system of claim 11, wherein the connector connects to a plurality of processor sockets on a main circuit board.

16. A method for operating a memory system, the method comprising:
    receiving, in a memory module, a command from a main processor, the receiving via a connector on a circuit card;
    transmitting the command from the connector to a buffered memory stack, the buffered memory stack comprising at least one memory vault, at least one memory controller, and at least one processing element arranged in a stack;
    processing the command in the at least one processing element of the buffered memory stack;
    reconfiguring a hub chip of the buffered memory stack to modify one or more of a bandwidth and speed of communication between the buffered memory stack and the main processor; and
    changing, by the buffered memory stack, the bandwidth and speed of communication between the buffered memory stack and the main processor during operation of the memory system.

17. The method of claim 16, wherein the memory module receives the command via a separable area array connector.

* * * * *